Jan. 26, 1965    W. R. RAMSEY    3,166,987
DEVICE FOR CONTROLLING THE CUTTING DEPTH OF A TOOL
Filed June 14, 1962    2 Sheets-Sheet 1
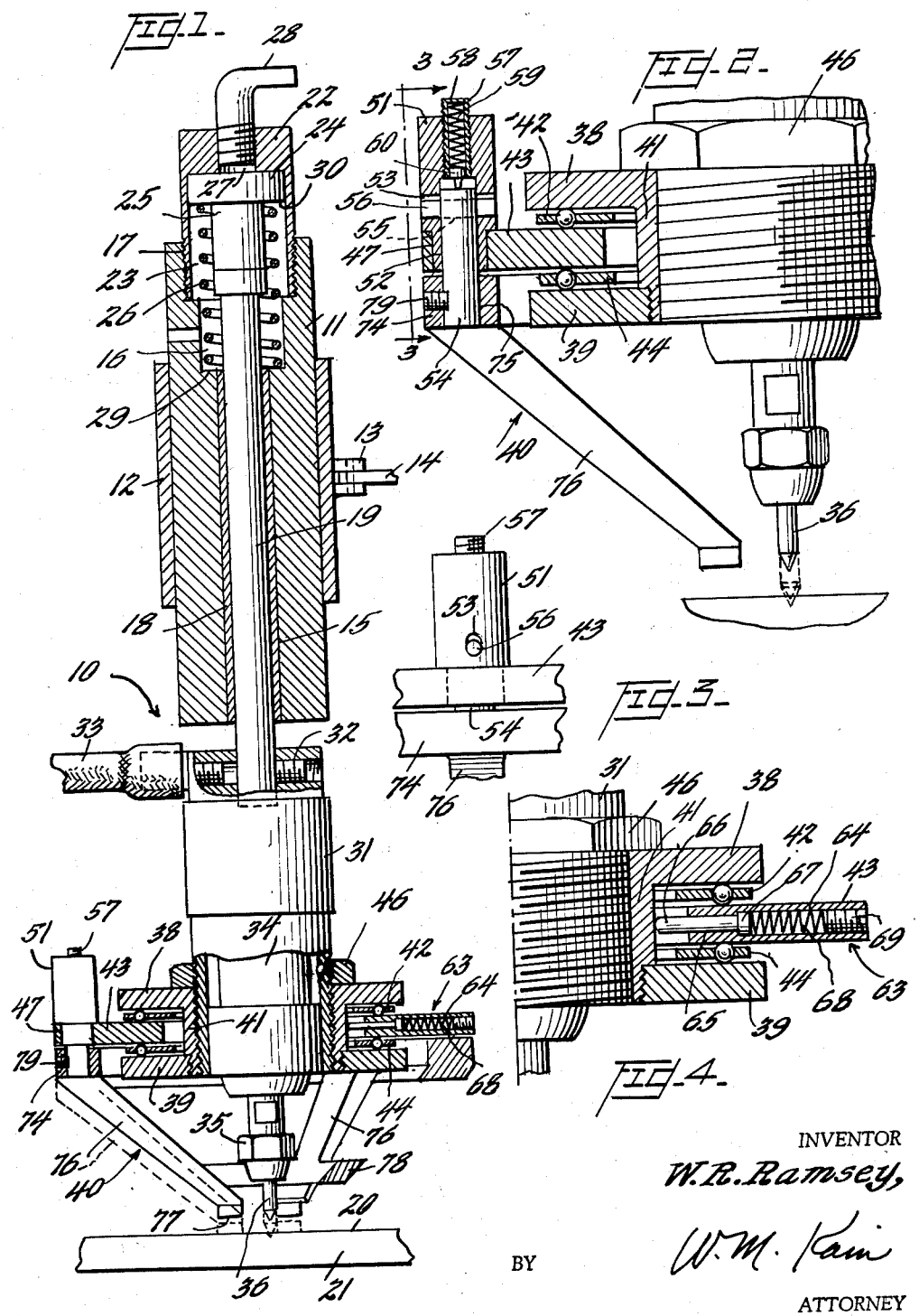
INVENTOR
W. R. Ramsey,
BY
W. M. Kain
ATTORNEY Jan. 26, 1965  W. R. RAMSEY  3,166,987
DEVICE FOR CONTROLLING THE CUTTING DEPTH OF A TOOL
Filed June 14, 1962  2 Sheets-Sheet 2
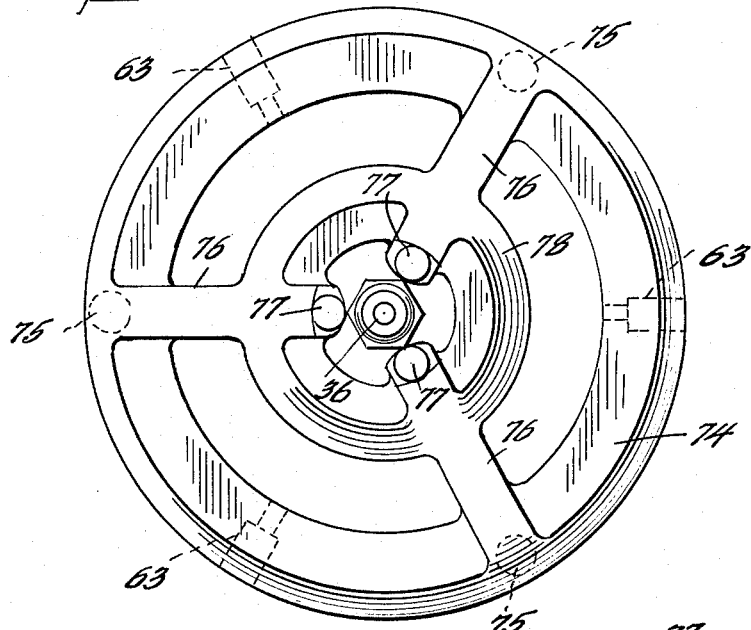
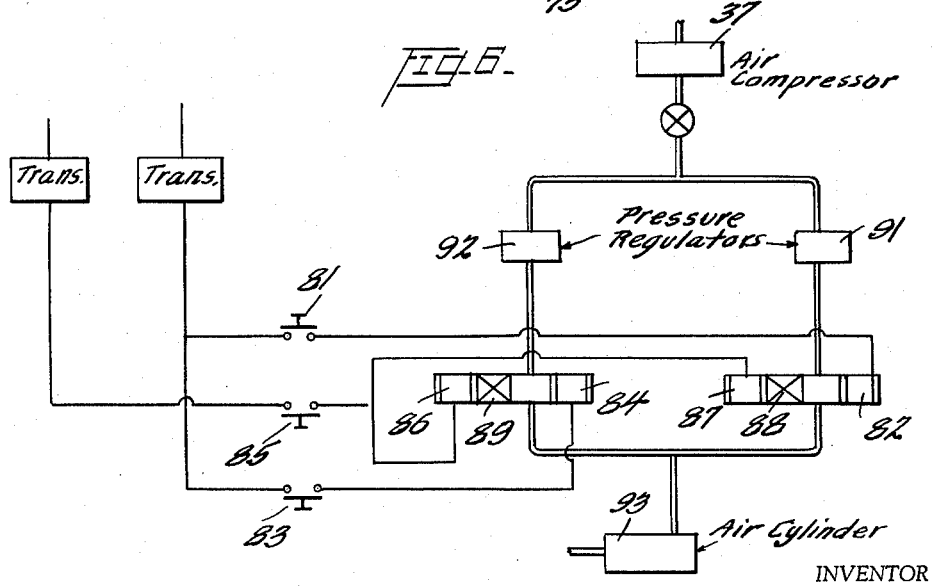
INVENTOR
W. R. Ramsey,
BY W. M. Kain
ATTORNEY

United States Patent Office 3,166,987
Patented Jan. 26, 1965

3,166,987
DEVICE FOR CONTROLLING THE CUTTING DEPTH OF A TOOL
William R. Ramsey, Graham, N.C., assignor to Western Electric Company, Incorporated, New York, N.Y., a corporation of New York
Filed June 14, 1962, Ser. No. 202,632
6 Claims. (Cl. 90—62)

The present invention relates to a device for controlling the cutting depth of a tool, and more particularly, to a device which is selectively positionable at a first or second depth of cut and remains stationary while a cutting tool moves relative to the device for performing a cut.

During the engraving of a surface, it has been found that a cut of substantial depth burrs the surface bordering the cut. In order to eliminate the burrs, it is necessary to take a second cut at a slightly greater depth. This entails manually resetting a cutting tool for a greater depth of cut and retracing the original cut. The manual resetting of the engraving tool for a greater depth of cut is time consuming and costly. Additionally, when a depth of cut limiting device is employed which contacts the surface adjacent the engraving tool, and, which moves with the engraving tool, it has been found that the sliding contact wears the device and often mars the surface. In order to eliminate these difficulties, it is necessary that a device be provided that is selectively positionable at a first or second depth of cut, which device remains stationary while the engraving tool moves to effect a cut.

It is a first object of the present invention to provide a new and improved device for controlling the cutting depth of a tool.

It is another object of the present invention to provide a device for limiting the cutting depth of a tool comprising spring-biased facilities for maintaining the tool at a first depth of cut and instrumentalities for advancing the cutting tool relative to the spring-biased facilities for maintaining the tool at a second depth of cut.

It is a further object of the present invention to provide a device having an annulus with circumferentially-spaced depending legs placed about a casing of an engraving machine which houses a cutting tool for limiting the depth of cut, with facilities interconnecting the annulus and the casing for permitting the tool to move relative to the legs during a cut and spring-urged units for centering the annulus about the casing.

With these and other objects in view, the present invention contemplates an engraving tool in combination with facilities that selectively position the tool to make cuts at different depths. A hub with a pair of spaced flanges is mounted about a casing of a standard engraving machine having a rotatable spindle and cutting tool. A support annulus is positioned in between the flanges with facilities for rendering the casing and hub movable relative to the annulus. A plurality of depending legs are supported by instrumentalities mounted in the annulus that are movable between a first and second position for varying the depth of cut. Additionally, the support annulus is provided with facilities for centering the annulus with relation to the hub.

Other objects and advantages of the present invention will be apparent from the following detailed description when considered in conjunction with the accompanying drawings wherein:

FIG. 1 is a fragmentary sectional view of a planographic engraving machine with a depth of cut limiting device constructed in accordance with the principles of the present invention;

FIG. 2 is an enlarged view, partially in section, illustrating selectively positionable facilities for limiting the depth of cut;

FIG. 3 is a side view taken along line 3—3 of FIG. 2 illustrating the selectively positionable facilities;

FIG. 4 is an enlarged view of a centering device and a mounting for rendering a casing and hub movable relative to a support annulus;

FIG. 5 is a bottom view of three feet and pads for limiting depth of cut; and

FIG. 6 is a diagram showing the electrical and pneumatic circuits for operating the mechanisms shown in the other figures.

Referring first to FIG. 1, there is shown an engraving machine, generally designated as 10. A housing 11 is supported by a sleeve 12 having a boss 13 which is pivotally connected to an arm 14 of a planograph (not shown). The housing 11 has a central bore 15 with enlarged, stepped upper portions 16 and 17. A bearing sleeve 18 is fitted in the bore 15 and extends to the enlarged section 16 of the bore 15. A shaft 19 is slidably mounted in the bearing sleeve 18.

A piston housing 22 having a bored-out portion 23 is threadedly secured in the enlarged section 17 of the housing 11. A piston 24 having a lower extension or rod 25 is connected to the shaft 19. A spring 26 is positioned about the shaft 19 and lower extension 25 of the piston 24 with one end resting on the lower face 29 of the enlarged section 16 and the other end contacting the under side 30 of the piston 24. An aperture 27 in the piston housing 22 receives an air supply pipe 28 which conducts air from a pressured source such as an air compressor 37, shown in FIG. 6 for actuating the piston.

A casing 31 of the engraving machine 10 is supported on the lower end of the shaft 19 and held in place by a socket set screw 32. The casing 31 houses a motor, not shown, which may be of any desired type. The embodiment depicted in FIG. 1 shows an air supply tube 33 connected into the casing 31 for driving an air motor (not shown). A rotatable shaft 34 is driven by the motor and has a chuck assembly 35 holding a cutting tool 36.

Referring now to FIGS. 1 and 2, a depth of cut limiting device, generally designated as 40, is shown. A hub 41 having an upper flange 38 and a lower internally threaded flange 39 is threaded onto the outer surface of the casing 31. A first ball bearing ring 42 having an inner diameter larger than the outer diameter of the hub 41 is positioned about the hub. A support annulus or plate 43 also having an inner diameter larger than the outer diameter of the hub, is positioned beneath the first ball bearing ring 42. A second ball bearing ring 44, identical with the first bearing ring 42 is also positioned about the hub beneath the annulus 43.

The assembly including the first and second ball bearing rings 42 and 44 and the annulus 43 is held in place by the lower internally-threaded flange 39 threaded onto the lower portion of the hub 41. As can be seen, the annulus 43 is laterally shiftable on the ball bearings freely about the hub in a plane substantially perpendicular to the axis of rotation of the rotatable spindle 34 and cutting tool 36. A lock nut 46 positioned above the hub 41 is tightened to secure the hub 41 against movement.

The support annulus 43 in this instance has three vertical apertures 47 equally spaced 120° apart adjacent its periphery. Rod housings 51 are mounted in the apertures 47. The rod housings 51 have central bores 52 and elongated key holes 53 intersecting the central bores. Rods 54 having key holes 55 of circular cross section are positioned in the central bores 52 of the rod housing 51 with the key holes 53 and 55 in alignment. Cylindrical stop pins 56 have diameters substantially equal to the diameters of the key holes 55. Stop pins 56 extend through the key holes 55 and 53 to retain the rods 54 in the bores 52. Spring-biased plunger units 57 comprising casings 58 housing springs 59, which bear on plungers 60, are threaded into the upper portions of the bores 52. The plungers 60 exert a downward force on the rods 54.

Referring now to FIGS. 2 and 3, it is noted that the key hole 53 is substantially longer than the diameter of the stop pin 56 that retains each rod 54, so that the rod may be moved relative to the rod housing 51 against the force of the spring 59. The movement of the rod 54 is arrested at two positions when the stop pin 56 either contacts the top or bottom of the elongated key hole 53.

A centering unit 63 is shown in FIG. 4 comprising a radially extending bore 64 in the annulus 43 terminating in a reduced inner diameter portion 65. A plunger 66 having a head portion 67 is positioned in the bore 64 and extends to the outer surface of the hub 41. A spring 68 placed in the bore 64 is retained by a set screw 69 and exerts a force against the head portion 67 of the plunger 66 to urge it towards the hub 41. In the embodiment shown, three centering units 63 (shown in outline in FIG. 5) are equally spaced 120° apart and positioned midway between the rod housings 51 for centering the annulus 43 about the hub 41.

A plate 74, shown in FIG. 5, has three equally-spaced apertures 75 positioned for alignment with the lower ends of the rods 54. Extending from the plate 74 are three inwardly-inclined legs 76 terminating in padded feet 77. A ring 78 interconnects the inclined legs 76 for added rigidity. The apertures 75 in the bracket 74 are inserted over the lower ends of the rods 54 and are retained thereon by set screws 79. The legs 76 and padded feet 77 are dimensioned so that as they depend from the lower ends of the rods 54, the bottoms of the padded feet terminate at a distance above the end of the cutting tool 36.

The casing 31 of the engraving machine 10 is moved vertically downward by admitting air into the piston housing 22 which forces the piston 24 downward against the force of spring 26. Upon removal of the air pressure applied to the piston 24, the casing 31 is moved upward by the force of the spring 26. The entire apparatus is coordinately movable by the planograph which acts through sleeve 12 laterally in a plane which is perpendicular to the vertical movement of the piston.

Describing the operation of the engraving machine, in accordance with the circuit shown in FIG. 6, a switch 81 is depressed to energize solenoid 82 which operates a valve 88 to admit air to the piston 24 to move the cutting tool into engagement with a surface 20 of a plate 21. The pads of feet 77 contact the surface 20 of the plate 21 as the tool 36 cuts into the plate. The feet 77 now remain stationary while the planograph is actuated to move the casing 31 and cutting tool 36 relative to the feet to perform a first cut.

During the first cutting operation, the air admitted to the piston 24 for moving the engraving tool 36 into cutting engagement with the surface 20, exerts less of a downward force on the annulus 43 than the spring-urged plungers 60 exert on the rods 54. The spring-urged plungers 60 therefore urge the rods 54 downward until the stop pins 56 contact the lower ends of the elongated key holes 53. Since the rod housings 51 are fixed in the apertures 47 in the annulus 43, the rod housings are precluded from moving relative to the rods 54, and the spring urged plungers 60 support the tool 36 at a first depth of cut.

At the completion of a cut, switch 83 is depressed to energize solenoid 84 to operate valve 89 to admit more air at a higher pressure to the piston 24. The additional downward force applied through the casing 31 and the hub 41 to the plate or annulus 43 causes the rod housings 51 to move downward relative to the rods 54 against the force of the springs 59 until the lower surface of the annulus 43 contacts the upper surface of the plate 74 and the stop pins 56 contact the upper surface of the elongated key holes 53. The cutting tool 36 is now positioned an additional distance beyond the level of the feet 77 for taking a final cut. The planograph is again actuated causing the tool to retrace the first cut at a greater depth. Switch 85 is then depressed to energize solenoids 86 and 87 which actuate valves 89 and 88, respectively, to remove the air pressure from the piston 24 and return the engraving machine to its original position.

The air at two pressures for advancing the tool 36 into the surface of plate 21 for taking the first cut at one depth and a final cut at a greater depth is supplied by a compressor 37. The air from the compressor 37 is diverted into first and second pressure regulators 91 and 92. Pressure regulator 91 admits air at valve 88 at a first pressure for lowering the tool 36 to take a cut at the first depth. Pressure regulator 92 admits air at valve 89 at a greater pressure than the air at valve 88 for positioning the tool for the final cut at a greater depth. The valves 88 and 89 function to admit the air at both pressures to an air cylinder 93 which is connected to the piston housing 22 via air supply pipe 28.

When the feet 77 and the cutting tool 36 are out of contact with the plate 21, the spring loaded plungers 66 of the centering units 63 reposition the annulus 43 and depth of cut limiting device 40 about the hub 41.

It is to be understood that the above-described arrangements of apparatus are simply illustrative of an application of the principles of the invention, and many other modifications may be made without departing from the spirit and scope of the invention.

What is claimed is:

1. In an engraving apparatus,
a spindle for receiving a cutting tool,
an annulus surrounding the spindle,
a plurality of circumferentially spaced legs mounted on and depending from the annulus, and
resilient means interposed between the annulus and the spindle for centering the tool within the circumferentially spaced legs.

2. In an engraving apparatus,
a spindle for receiving a cutting tool,
a plate having a plurality of circumferentially spaced legs depending therefrom,
resilient means for supporting the plate on the spindle so that the tool projects beyond the depending extremities of the legs, and
means for applying a force to the spindle to overcome the resilient means to advance the tool a further distance beyond the extremities of the legs.

3. In a fabricating machine having a movable casing housing a rotatable tool for cutting a surface,
a hub having a pair of spaced flanges mounted about said casing,
an annulus surrounding the hub and mounted intermediate said flanges for lateral movement in a plane perpendicular to the axis of rotation of said tool,
a plurality of rods slidably mounted in said annulus for axial movement,
resilient means for supporting the rods in said annulus,
a plurality of legs depending from said rods for contacting said surface, and
means for moving said housing and annulus against the effect of the resilient means to advance the tool into said surface.

4. In a machine for producing a cut in a surface wherein a movable casing houses a rotatable spindle and cutting tool,
a hub having a pair of flanges mounted about said casing,
a support plate having a central aperture positioned about said hub,
a plurality of legs depending from said support, means positioned about said hub and engaging said support plate for mounting said support for lateral movement in a plane parallel to said surface, means for moving said casing downward to contact said legs on said surface and to position said tool in cutting relationship with said surface, resilient means for supporting said support plate and tool at a first depth of cut, and means for applying a force to overcome said resilient means to support said plate and tool at a second depth of cut.

5. In a device for taking a preliminary and a final cut in a surface at a first and second depth in combination with an engraving machine having a movable casing housing a rotatable spindle and a cutting tool, a support rotatably mounted about said casing having a plurality of spaced vertical apertures adjacent the periphery, a plurality of rod housings having vertical bores and elongated key holes intersecting the bores fixed in said apertures, a plurality of rods having circular key holes extending into said bores, means extending through said key holes in said rods and rod housings for limiting the movement of said rods from a first to a second position, a leg extending from each of said rods and terminating at a fixed distance above the tip of said cuting tool, resilient means positioned in the bores in said rod housings for urging said rods to position said legs at said first position, means for moving said tool into cutting engagement with said surface and said legs into contact with said surface at the first depth of cut, means for moving said tool downward relative to said legs, means for arresting the movement of said tool at the second depth of cut, means for disengaging said feet and cutting tool from said surface, and means rendered effective upon the disengagement of said feet and cutting tool from said surface for centering said support about said casing.

6. In an engraving apparatus, a spindle for receiving a cutting tool, a plate having a plurality of circumferentially spaced legs depending therefrom, resilient means interposed between the plate and the spindle for centering the tool between the legs, a second resilient means for supporting the plate on the spindle so that the tool projects beyond the ends of the legs, and means for applying a force to the spindle to overcome the second resilient means to advance the tool a further distance beyond the ends of the legs.

References Cited in the file of this patent
UNITED STATES PATENTS

| 1,705,957 | Braren | Mar. 19, 1929 |
| 2,178,130 | Zwick | Oct. 31, 1939 |
| 2,445,903 | Bentzman | July 27, 1948 |

FOREIGN PATENTS

| 1,120,249 | Germany | Dec. 21, 1961 |